United States Patent [19]

Wentorf, Jr. et al.

[11] 3,745,623
[45] July 17, 1973

[54] DIAMOND TOOLS FOR MACHINING

[75] Inventors: Robert H. Wentorf, Jr., Schenectady; William A. Rocco, Scotia, both of N.Y.

[73] Assignee: General Electric Company, Schenectady, N.Y.

[22] Filed: Dec. 27, 1971

[21] Appl. No.: 212,408

Related U.S. Application Data

[63] Continuation-in-part of Ser. No. 26,660, April 8, 1970, abandoned.

[52] U.S. Cl. .............................. 29/95 B, 76/101 A
[51] Int. Cl. ........................ B26d 1/00, B21k 21/00
[58] Field of Search .................. 29/95, 95 B, 95 C; 76/101 A

[56] References Cited
UNITED STATES PATENTS

| | | | |
|---|---|---|---|
| 3,702,573 | 11/1972 | Nemeth | 76/101 A |
| 3,407,445 | 10/1968 | Strong | 76/101 A X |
| 3,101,260 | 8/1963 | Cheney | 76/101 A X |

OTHER PUBLICATIONS

Patent Bulletin from Japanese Classification of the Japanese Patent Office Re: Japanese Patent No. 1969-78-18–announced April 12, 1969–Entitled "Method of Manufacturing Diamond Dispensed Superhard Alloy,"

*Primary Examiner*—Harrison L. Hinson
*Attorney*—John F. Ahern et al.

[57] ABSTRACT

Diamond tools and superpressure processes for the preparation thereof are described wherein the diamond content is present either in the form of a mass comprising diamond crystals bonded to each other or of a thin skin of diamond crystals bonded to each other. In each instance the diamond content is supported on and directly bonded to an extremely stiff sintered carbide substrate in order to provide mechanical support therefor to more effectively utilize the high elastic modulus of the diamond.

18 Claims, 10 Drawing Figures

DIAMOND TOOLS FOR MACHINING

BACKGROUND OF THE INVENTION

This is a continuation-in-part of U.S. Pat. application Ser. No. 26,600 — Wentorf, Jr. et al., filed Apr. 8, 1970, now abandoned and assigned to the assignee of the instant invention.

Both diamond impregnated wheel dressers and diamond cut-off wheels have been constructed employing as the abrading medium various mixtures of cemented carbide and diamond grit. Neither of these types of tools is used to directly produce an ultimate component and, therefore, these are not considered machining tools nor are such tools constructed with the capability to withstand the great stress imposed by direct machining.

As is pointed out in the article "Diamond-Impregnated Carboloy" by George F. Taylor (General Electric Review, Vol. 37, No. 2 February, 1934, pages 97–99) in column 2 on page 98 "The adhesive bond between the Carboloy and the diamond is so strong that when the mass is fractured the grains lying along the fracture are split through, each part adhering to its Carboloy matrix." In the process disclosed for producing a wheel dresser the powdered metallic ingredients for the Carboloy cemented carbide are mixed with crushed diamond and heated to normal sintering temperatures for producing cemented carbide.

In U.S. Pat. No. 2,818,850 — Schwarzkopf et al. arcuate cutting segments used in cut-off blade construction are prepared using powder mixtures of tungsten carbide plus cobalt alone and with diamond dust. Each segment is composed of a larger portion (initially a mixture of tungsten carbide plus cobalt plus diamond) and a smaller portion (initially a mixture of tungsten carbide plus cobalt). The smaller portion is located radially inward of the larger portion (a) so that the segment can be ground to fit perfectly onto the metal wheel and (b) in order to provide a surface free of diamond particles for ease of brazing (or otherwise uniting) the cutting segment to the steel disc. A hot pressing sequence is employed (1,400°–1,650° C and 1,000–4,000 psi) to convert the tungsten carbide/cobalt mixture to cemented carbide.

A similar construction of arcuate abrasive sectors for cut-off wheel construction is disclosed in U. S. Pat. No. 2,796,706 — Anderson with the additional teaching that the carbide molding powder may contain carbide selected from the group consisting of tungsten carbide, titanium carbide and tungsten carbide and mixtures thereof. Although nickel or iron can be used as the bonding metal for sintered carbide, cobalt is preferred. The initial material mix employed in preparation of the abrasive sectors differs from the Taylor article and Schwarzkopf et al in that the mixture includes some previously sintered carbide.

In each of the aforementioned constructions, since the adhesive bond between the cemented carbide and the diamond is relied upon to hold the diamonds in the structure, the diamond content must necessarily be less that that percentage at which there would be substantial diamond to diamond contact.

In the text "Industrial Applications of the Diamond" by Norman R. Smith (Hutchinson and Co., First Edition 1965) on page 119 et seq. it is stated that "Diamond tipped tools are also used for the direct machining of non-ferrous metals and other materials." On page 120 a description is set forth of how such tools are made and there is a statement near the bottom of the page that diamond tipped machining tools "can be used for practical purposes only on the non-ferrous metals, plastics, carbon and hard rubber."

As is described in the Smith text on page 120 first the diamond (usually ½ to 1 carat) must be carefully selected; next the diamond must be properly positioned in the tool to assure certain grain orientation and thereafter, the tool is set in a powder metal insert of rectangular form. This powder metal insert serves to locate the diamond in relation to jigs that are used to shape the diamond to its cutting form. After proper shaping of the diamond, the insert is brazed in a slot in the tool shank. This tool shank is then machined to proper size while simultaneously correctly positioning the working surface of the diamond in relation to the tool shank.

The development of tools for machining plastics, reinforced plastics, ceramics, graphite composites and non-ferrous metals, which have a lower initial cost than the aforementioned diamond-tipped tools and which do not have the susceptibility of these single-point diamonds to fracture and destruction would be of great benefit to the art.

SUMMARY OF THE INVENTION

The instant invention by the application of high pressure, high temperature technology provides a solution to the aforementioned problem enabling the preparation of diamond tipped machine tools in which in place of utilizing a single diamond, the working diamond content is present (a) in the form of a mass of diamond crystals bonded to each other or (b) in the form of a thin skin of diamond crystals bonded to each other. In order to fully utilize the machining capabilities of the diamond content in machining operations in which the diamond working edge may be subjected to pressures as high as 1,000,000 psi, the diamond content is supported on and directly bonded to a mass of extremely stiff cemented carbide substrate significantly larger in size than the diamond material being supported thereon.

BRIEF DESCRIPTION OF THE DRAWING

This invention will be better understood from the following description and drawing in which.

DESCRIPTION OF THE PREFERRED EMBODIMENT

One preferred form of a high pressure, high temperature apparatus in which the composite tool insert of the instant invention may be prepared is the subject of U. S. Pat. No. 2,941,248 — Hall (incorporated by reference) and is briefly illustrated in FIG. 1. The process employed in the practice of this invention is described in U. S. Pat. No. 3,609,818 — Wentorf, Jr. (incorporated by reference).

Figures 1, 2, 3, 4, 5, 6, 7, 8:
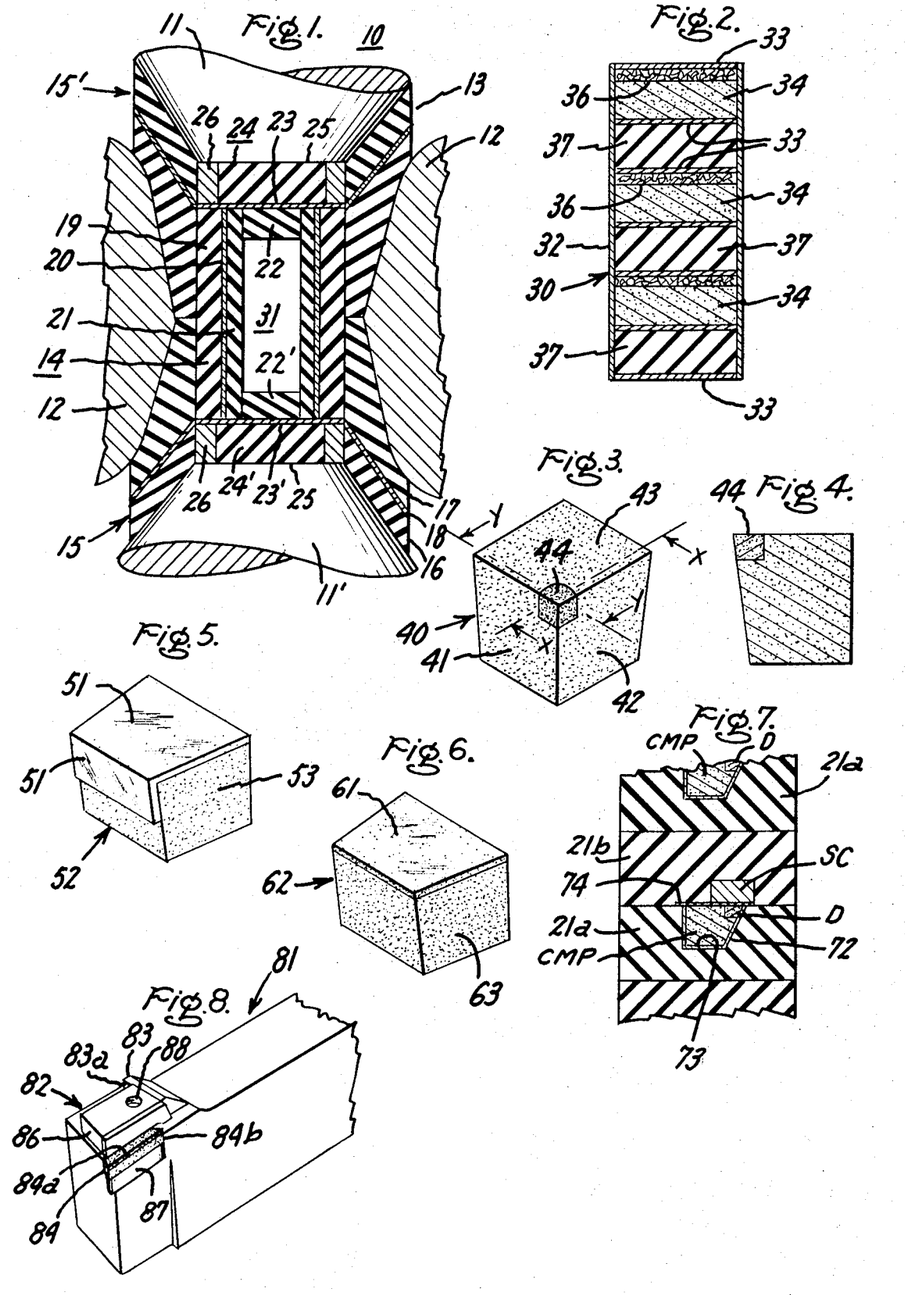
FIG. 1 illustrates one exemplary high pressure, high temperature apparatus useful in the preparation of the product of this invention.
FIG. 2 illustrates in section one form of charge assembly configuration for use within the apparatus of FIG. 1 in the practice of the instant invention.
FIG. 3 is a three dimensional view illustrating a composite diamond machine tool insert.
FIG. 4 is a section taken through the insert of FIG. 3 either on line X—X or on line Y—Y.
FIGS. 5 and 6 are each three dimensional views of composite diamond/sintered carbide machine tool inserts prepared according to this invention.
FIG. 7 is a sectional view showing a combined liner/charge assembly for preparing the structures of FIGS. 3, 5 and 6.
FIG. 8 is a three-dimensional view of a cutting tool assembly with an indexable tool insert of this invention shown in place and FIGS. 9 and 10 are photomicrographs (about 250X magnification) of polished surfaces of the layer of diamond fines prepared as part of a composite tool insert by the process of this invention.

Apparatus 10 includes a pair of cemented tungsten carbide punches 11 and 11' and an intermediate belt or die member 12 of the same material. Die member 12 includes an aperture 13 in which there is positioned a reaction vessel 14. Between punch 11 and die 12 and between punch 11' and die 12 there are included gasket/insulating assemblies 15, 15', each comprising a pair of thermally insulating and electrically nonconducting pyrophyllite members 16 and 17 and an intermediate metallic gasket 18.

Reaction vessel 14 in one preferred form, includes a hollow salt cylinder 19. Cylinder 19 may be of other material, such as talc, which (a) is not converted during high pressure-high temperature operation to a stronger, stiffer state (as by phase transformation and or compaction) and (b) is substantially free of volume discontinuities occurring under the application of high temperatures and pressures, as occurs, for example, with pyrophyllite and porous alumina. Materials meeting the criteria set forth in U. S. Pat. No. 3,030,662 (column 1, lines 59 through column 2, line 2, incorporated by reference) are useful for preparing cylinder 19.

Positioned concentrically within and adjacent cylinder 19 is a graphite electrical resistance heater tube 20. Within graphite heater tube 20 there is in turn concentrically positioned the cylindrical salt liner 21. The ends of liner 21 are fitted with salt plugs 22, 22', disposed at the top and bottom, respectively. As will be described hereinbelow liner 21 may have a cylindrical hollow core to receive one large charge assembly containing sub-assemblies or the liner may consist of a series of mold assemblies arranged in a stack for the preparation of a plurality of composite tool inserts, e.g. as shown in FIGS. 3, 5, and 6.

Electrically conductive metal end discs 23 and 23' are utilized at each end of cylinder 19 to provide electrical connection to graphite heater tube 20. Adjacent each disc 23, 23' is an end cap assembly 24 and 24' each of which comprises a pyrophyllite plug or disc 25 surrounded by an electrical conducting ring 26.

Operational techniques for simultaneously applying both high pressures and high temperatures in this apparatus are well known to those skilled in the superpressure art. The foregoing description relates to merely one high pressure, high temperature apparatus. Various other apparatuses are capable of providing the required pressures and temperatures that may be employed within the scope of this invention.

FIG. 2 illustrates an arrangement for producing a plurality of disc- or pill-shaped composites (sintered carbide substrate with a layer of sintered diamond formed thereover). Charge assembly 30, although not illustrated in proportion, fits within space 31 of the apparatus of FIG. 1.

Charge assembly 30 consists of cylindrical sleeve 32 of shield metal selected from the group consisting of zirconium, titanium, tantalum, tungsten and molybdenum. Within cylindrical shield metal sleeve 32 are disposed a number of sub-assemblies protected above and below by shielding discs 33 made of titanium or zirconium. Each sub-assembly so protected on all sides consists of larger mass 34 and smaller mass 36. Each mass 36 is largely or completely made up of diamond powder (in the size range from about 0.1 micrometer to 500 micrometers in largest dimension).

Each mass 34 consists of a carbide molding powder, preferably a mixture of tungsten carbide powder plus cobalt powder. Unexpectedly, whether or not the carbide molding powder is initially separate from the diamond powder as shown in FIG. 2 or whether some carbide molding powder is mixed with the diamond, the cobalt content makes itself available to function both (a) as the metal bond for sintering the carbide and (b) as a diamond-making catalyst required for conversion of graphite to diamond. It is well known in the art of preparing cemented carbides that the reason cobalt is able to accomplish the requisite cementing action is because of its strong tendency for dissolving carbides. It was not expected that the cobalt mixed in the carbide molding powder would look to a source of carbon other than the nearby carbide or (in view of the dissolution of carbide therein) that the cobalt would retain capability to dissolve elemental carbon and be able to function as a diamond-making catalyst. On the contrary it has been found that the cobalt is able to conduct both functions admirably and based upon the results with cobalt, it is expected that nickel and iron and mixtures of any of cobalt, nickel and iron should perform the same functions.

The mass 36 may, therefore, contain minor quantities of graphite powder or carbide molding powder in addition to the diamond powder. Also, instead of arranging masses 34 and 36 with a sharp transition from the carbide-cobalt powder mix to the diamond powder layer, a transition layer (not shown) may be provided between the carbide-cobalt mass and the diamond layer. This transition layer would contain both carbide-cobalt powder and diamond grit in a gradated mix to minimize stress concentrations.

Even with mass 36 completely composed of diamond crystals the capability for diamond growth is still required in order to reconvert to diamond (a) such graphite as is formed during the conduct of the consolidation process and (b) such diamond as may dissolve in the catalyst-solvent metal in regions of high free energy and regions of high temperature.

In order to retain the benefits of mechanically unstable structuring of the charge assembly, discs 37 are made of the same material as cylinder 19 to provide necessary "follow through" action to occupy reduced volume within each sub-assembly during the process.

In the preparation of tool inserts by the instant process the charge assembly 30 is placed in the apparatus 10, pressure is applied thereto and the system is then heated. The temperatures employed are in the range from about 1,300°–1,600° C for periods of time in excess of about 3 minutes in order to sinter the carbide/cobalt mixture while at the same time the system is subjected to very high pressure e.g. of the order of 55 kilobars to insure thermodynamically stable conditions for the diamond content of the system. At 1,300° C the minimum pressure should be about 50 kilobars and at 1,400° C the minimum pressure should be about 52.5 kilobars. At the temperatures employed, of course, the cobalt component of the system is melted making some of the cobalt available for displacement from mass 34 into mass 36, where it functions as a catalyst-solvent for diamond growth.

Thus, at the same time (a) the carbide is converted to the sintered state, (b) the diamond crystals in mass 36 become consolidated into a mass of sintered diamond and (c) an excellent bond develops at the interface between diamond-rich mass 36 and cemented carbide mass 34 to produce a truly integrated mass. When pressure is applied to the system, some diamond grains are crushed, but because of the presence of diamond catalyst, these grains consolidate and heal under diamond-stable pressures and temperatues. At the interface between masses 36 and 34 any small spaces between diamond crystals accommodate intrusions of sintered carbide, which is somewhat plastic at the operating temperatures. Thus, at the interface the diamond particles are firmly interlocked with and bonded to the sintered carbide.

The direct bonding relationship created in situ between the very high strength diamond material and the significantly larger mass of underlying stiff support material obviates any need for the interposition of any bonding layer therebetween, as for example, would result from brazing or soldering. By providing stiff, nonyielding support material in direct contact with the diamond-rich machining edge region, the incidence of fractures in the diamond material is greatly minimized.

Further, the diamond-rich region is primarily a cluster of diamond crystals bonded together in self-bonded relationship with the diamond particles disposed in random fashion. In order for an incipient fracture to produce cleavage of the diamond mass (or layer) the cleavage plane would have to follow a tortuous course dictated by the random disposition of the cleavage planes of the individual particles. Thus, any fracture which is initiated will be unable to extend very far into the diamond compact.

The preparation of diamond compacts for use as the abrading elements in cutting and grinding tools wherein at least 50 percent by volume of the compact consists of diamond crystals is disclosed in U. S. Pat. No. 3,141,746 — De Lai (incorporated by reference). The compact so prepared is then attached to some support. There is no teaching in De Lai leading the technician to the in situ creation of a composite tool insert in which a diamond compact when formed is integrated with a sintered carbide support mass as in the instant invention nor is there any indication that cobalt present either in a carbide molding powder (or in cemented carbide) will make itself available as a catalyst to the diamond-forming reaction.

The material for mass 34 is preferably a tungsten carbide molding powder (mixture of carbide powder and cobalt powder) commercially available in grit sizes of from 1 to 5 microns. The tungsten carbide may, if desired, be replaced in whole or in part by either or both of titanium carbide and tantalum carbide. Since some use of nickel and iron has been made in the bonding of carbides, the material for providing the metal bond in the cemented carbide may be selected from the group consisting of cobalt, nickel, iron and mixtures thereof. Cobalt, however, is preferred as the metal bond material. All three of the aforementioned metals function as catalyst-solvents for diamond synthesis and, therefore, any of these three metals can exercise the dual functions required in the practice of this invention. The composition of carbide molding powders useful in the practice of this invention may consist of mixtures containing about 80–97 percent carbide and about 3–20 percent cobalt by weight.

The preferred diamond content of mass 36 will range from 90 to 99 + percent by volume. However, a somewhat lower content of diamond grit may be employed, the lowest diamond content being about 70 percent diamond (by volume).

If desired, a thin sheet of catalyst-solvent may be disposed between any or all of masses 34 and the masses 36 adjacent thereto to supplement the carbide-bonding/catalyst-solvent metal. The useful catalyst-solvent materials are disclosed in U.S. Pat. No. 2,947,609 —Strong and U.S. Pat. No. 2,947,610 — Hall et al., both of which are incorporated by reference. This disposition of catalyst metal is compatible with a mechanically unstable structural system. However, it has been found that the additional catalyst metal is not required and ordinarily not preferred.

Referring now to the composite tool inserts shown in FIGS. 3, 5 and 6, direct preparation of these non-symmetrical shapes requires a modified construction of salt liner 21 and plugs 22, 22'. However, non-symmetrical shapes (e.g. the insert shown in FIG. 6) and symmetrical shapes can also be made by first preparing a pill-shaped composite (as would result from the arrangement of FIG. 2) and then cutting and shaping the unit. For the preparation of non-symmetrical shapes the structure fitting within heater tube 20 may be formed as a series of cylindrical blocks in stacked cooperating arrangement to provide molds to be filled with the powder constituents of carbide molding powder (CMP) and diamond fines (D). By way of example, in FIG. 7 salt block 21a has formed therein a recess 72 replicating the shape of the desired tool insert allowing for the thickness of the protective metal sheath 73. Recess 72 is lined with metal 73 as shown and powdered masses CMP and D are properly located therein. Cover salt block 21b has recesses therein to accommodate cover sheet 74 completing the protective metal enclosure for the powders and, preferably, a back-up block of sintered carbide SC to minimize puncturing of the protective metal layer 74. A number of such cooperating pairs of salt blocks such as 21a, 21b may be employed with the contents described.

In the tool insert construction 40 of FIG. 3 both faces 41 and 42 of the cemented carbide 43 and diamond compact 44 are formed with a rake (FIG. 4) to facilitate presentation of the diamond cutting edges of diamond compact 44 to the work piece.

In forming the thin layers 51, 61 of consolidated diamond in the tool insert constructions 52, 62 shown in FIGS. 5 and 6, the layer of diamond fines bonded to cemented carbide bodies 53, 63, respectively, is limited to a maximum thickness of about 30 mils (0.75 mm) and a minimum thickness of about ½ mil (0.012 mm) although the capability exists for preparing such layers in thicknesses as great as about 80 mils. The purpose of deliberately making these layers 51, 61 very thin is in order (a) to present the diamond layers 51, 61 as chip breaker faces and (b) to make it easier to sharpen the tool inserts 52, 62. Ideally, the relationship between the properties of the diamond layer to the cemented carbide will be such that the edge of the diamond will wear away slightly less rapidly than the cemented carbide. When this condition prevails a small amount of the diamond layer will continue to project beyond the cemented carbide support body to provide a cutting edge and the amount of diamond utilized will be commensurate with the life of the tool.

The layer of material placed in the mold over the carbide molding powder may be diamond grit, or a thin layer of graphite to be converted to diamond during high pressure, high temperature exposure under diamond-stable conditions using the bonding metal of the carbide molding powder as the catalyst. Mixtures of graphite and diamond may also be used. However, a basic requirement is that the consolidated diamond-rich region of any of the completed composite tool inserts must have a concentration of diamond therein greater than 70 percent by volume and, preferably, in excess of 90 percent by volume.

After completion of the high temperature, high pressure process, which simultaneously achieves (a) sintering of the carbide powder, (b) creation of a strong consolidated mass of diamond crystals (or thin sheet of consolidated diamond crystals) and (c) the creation of an extremely effectively interface bonding the diamond to the sintered carbide, first the temperature and then the pressure are reduced. Upon recovery of the tool insert masses, the protective sheath metal remains strongly affixed to the outer surfaces thereof. Exposure of the desired surfaces of the composite tool insert is accomplished by simply grinding away the protective sheath.

Since some of the protective sheath is converted to the carbide, the alternative is available whereby by not grinding away all of this covering material a thin outer layer of titanium carbide or zirconium carbide can be left over the chip breaker face of the diamond-rich regions 43, 51, 61. Greater amounts of carbide may be introduced in the surface of the chip breaker face by adding a small amount of titanium carbide (or zirconium carbide) powder in the layer of diamond fines D in filling cavity 72 or by using synthetic diamond or graphite which contain titanium. By having the exposed surface of the compacted diamond-rich region contain small crystals of titanium carbide incorporated therein, for example, the life of the chip breaker face should be increased and should minimize the deleterious effect on the tool insert of the hot metal being removed from the workpiece.

FIG. 8 shows an assembled cutting tool comprising a shank portion 81, a head portion 82, and a ridge 83 having a vertical shoulder 83a defining the rear boundary of the head portion. Indexable cutting insert 84 in the shape of a triangular prism with diamond-rich layer 84a bonded to sintered carbide support block 84b is firmly retained by cutter bit clamp 86. Insert 84 is releasably held so that its cutting surface is exposed slightly beyond cutter bit seat 87 made of any hard metallic substance (e.g. cemented carbide). Cutting insert 84 may be tightened into position or removed for repositioning (indexing) or replacement by turning a set screw (not shown) in aperture 88. Various configurations of cutting insert may be employed, e.g. cylindrical, rectangular solid, etc.

Figure 9:
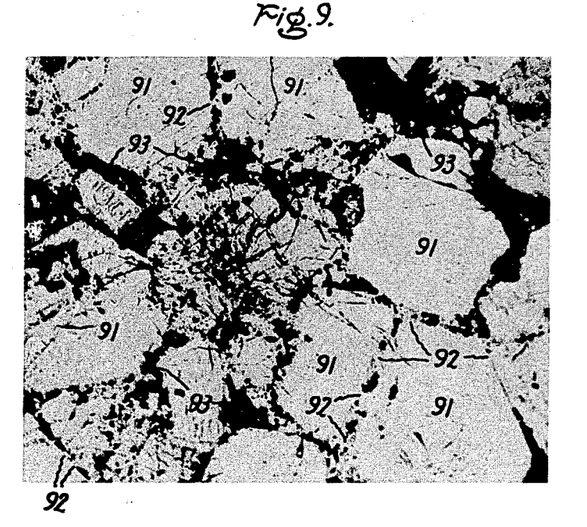
Figure 10:
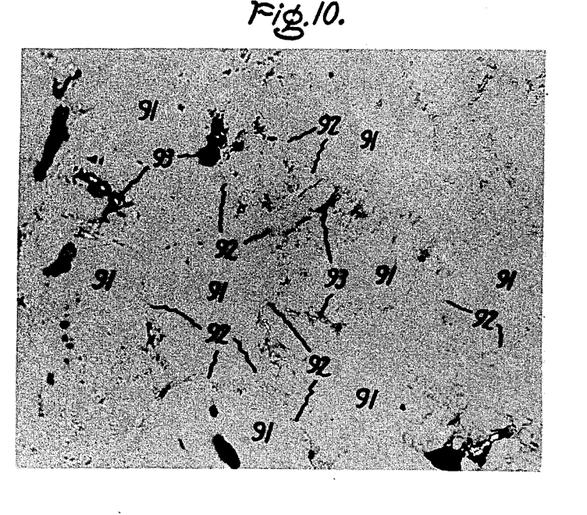

FIGS. 9 and 10 together show the effect of increased consolidation on the extent of diamond-to-diamond bonding in the polycrystalline diamond-rich layer of the composite tool insert. Increasing consolidation is favored by exposure to the high pressures and high temperatures according to the method of this invention for longer times during preparation of the composite tool insert. Thus, FIG. 9 shows the polished surface of a diamond-rich layer of a composite tool insert wherein the area (or volume fraction) of bonded diamond grains 91 is about 90 percent of the total. The exposure time to high pressure and temperature was 15 minutes. Interfaces 92 are representative of diamond-to-diamond bonding between adjacent crystals. These same diamond crystals 91 seen in the polished surface of FIG. 9 are bonded in the third dimension to adjacent diamond crystals (not seen). Although regions 93 between crystals 91 may be cobalt metal, nickel metal or iron carbide, depending upon what metal bond material is employed for the carbide powder, in this particular composite regions 93 are mostly cobalt metal. FIG. 10 shows the polished surface of a diamond-rich layer wherein the initial concentrations of materials, the pressure and the temperature were substantially the same as for the layer of FIG. 9, but was subjected to these conditions for 45 minutes longer than the composite of FIG. 9. The numerals employed in FIG. 10 represent the same characteristics as in FIG. 9. The effect was to almost completely consolidate the diamond grains 91 so that most of the diamond grains 91 are in intimate contact with each other over most of their peripheries, the area (or volume fraction) of diamond being over 95 percent of the total.

A fragment of a composite tool insert consolidated as shown in FIG. 10 was placed in a warm mixture of HF, HCL and $HNO_3$. The sintered carbide portion dissolved in less than 1 hour, but the diamond portion (initially individual grains) of the fragment remained intact and strong after 4 hours of this exposure. The diamond fragment was then placed in a fresh batch of this acid mixture for 60 hours at 27° C and 6 hours at 100° C with no change occurring. No metal was visible in examining the fragment under the microscope (36X), but the fragment still responded to a strong magnet. Apparently, some small quantity of cobalt was trapped within the structure where it could not be reached by the acid. Similar acid treatment of less dense diamond-rich layers (e.g. 70 to 90 percent diamond by volume) was able to remove all metal so that the compacted diamond mass, which remained intact because of the direct diamond-to-diamond bonding, was no longer affected by a magnet. The high tensile strength (estimated to be about 20,000 psi) of the mass of compacted diamond grains indicates the extent of diamond-to-diamond bonding. Broken masses were examined and no metal could be seen on the broken surfaces at 36X magnification.

If desired, another variation that may be made in the process of preparation of the tool inserts of this invention is the use of cemented carbide in place of the carbide molding powder. In such a process metal-lined cavity 22 receives a pre-formed cemented carbide body contiguous with a diamond-rich region to form the desired chip breaker face. Even under these conditions the bonding metal in the solid cemented carbide body will be effective as catalyst-solvent for the diamond compaction and/or conversion.

Regardless of whether the composite tool insert of this invention is prepared using carbide molding powder or previously cemented carbide, the requisite diamond-to-diamond bonding and the carbide/diamond interface bonding both occur, when greater than 70 percent by volume of diamond is employed in the abrasive mass adjacent the cemented carbide. In both instances the interface bond between the diamond material and the cemented carbide components is stronger than the tensile strength of diamond, because of the high pressure, high temperature process employed.

Thus, by the practice of the instant invention the less expensive diamond material obtained from nature or synthetically prepared (e.g. diamond grit ranging from 60 mesh to 325 mesh [U. S. Sieve]; poorly crystallized and other reject material) may be embodied into a product useful in the direct machining of metals, because of the improved strength and resistance to shock and wear thereof. The indexable composite tool inserts of this invention are of value in turning, boring and milling operations on non-ferrous metals such as copper, brass, bronze, silver, gold, platinum and alloys of aluminum, magnesium, titanium and zinc. These tool inserts are of particular interest in the machining of non-metallic materials, such as plastics, composites, and ceramics and have been successfully tested on flame-sprayed alumina, graphite, glass-impregnated plastic materials, ceramics and ablative materials for re-entry nose cones.

EXAMPLE 1

A uniform mixture of 58 volume % diamond (60 to 80 mesh) and 42 volume % of carbide molding powder (87 weight % tungsten carbide/13 weight % cobalt) were placed in a cylindrical mold lined with zirconium metal (as mass 34 in FIG. 1). A layer (about 0.5 mm thick) of the same diamond fines was spread over the top (as layer 36). This system fully enclosed in zirconium was subjected to a pressure of about 57 kilobars and 1,500° C for 10 minutes. After the temperature and pressure were reduced, the resultant composite body was recovered and used successfully to shape an aluminum oxide grinding wheel as one would use a cutting tool.

EXAMPLE 2

A lined mold similar to that used in EXAMPLE 1 was partly filled with 75 mg of 325 mesh diamond powder mixed with 25 mg of graphite powder. On top of this first layer was placed a metal disc (10 wt % Al, 90 wt % Fe) about 0.1 mil thick. A second layer was placed over this disc consisting of 87 wt % tungsten carbide powder/13 wt % cobalt powder. This system fully enclosed in protective zirconium metal was subjected to a pressure of about 56 kilobars and 1,500° C for 30 minutes. After the temperature and pressure were reduced a monolithic cylindrical body was recovered. The diamond layer was sintered together and was strongly bonded to the sintered carbide adjacent thereto. This body was later brazed into a suitable strong holder and the diamond layer was shaped to form a cutting tool. This tool was successfully used to machine Rene 41 alloy.

EXAMPLE 3

The process of EXAMPLE 2 was repeated without the Al-Fe disc. A similar monolithic body was recovered with the sintered layer of diamond strongly bonded to the sintered carbide. This cylinder was also mounted in a holder by brazing and shaped for use as a cutting tool.

EXAMPLE 4

A system was prepared wherein a solid disc of cemented carbide (94 wt % tungsten carbide/6 wt % cobalt) is used as a pressure back-up member. This piece of cemented carbide was placed in a zirconium-lined mold and covered with a thin sheet of zirconium metal. A layer of diamond powder (30 mg of 100 mesh diamond) about 0.4 mm thick was spread over the zirconium sheet and a second disc of the cemented carbide 0.13 inch thick was placed over and in contact with the diamond layer. This entire assembly together with the protective zirconium metal, was exposed to about 57 kilobars pressure and a temperature of about 1,500° C for 60 minutes. The diamond layer of the composite cylinder recovered had been consolidated, with the diamond crystals firmly bonded together and also bonded to the cemented carbide body. After polishing the diamond layer to form a cutting tool, microscopic examination revealed extensive bonding between adjacent diamond grains and healing or re-joining of diamond grains which had been broken during initial cold compression of the specimen. In a dry cutting test on Rene 41 alloy moving at 50 feet per minute this tool was used to remove a chip 0.090 inch wide and 0.010 inch thick and the chip separated from the metal at red hot temperature. This tool performed better than a standard sintered carbide tool by showing less wear and producing better chip and surface finishes. There was no cracking off or spalling of the diamond layer as it wore away.

A round bar of steel 4.5 inches in diameter and 40 inches long was coated with aluminum oxide by a high temperature spray process to produce a hard, dense coating about 0.030 – 0.035 inch thick having a hardness of about 70 Rockwell "C." This coated bar was mounted in a lathe and various tools described below were used to machine the oxide surface thereof. Cutting speed was 100 feet/minute and the feed and depth of cut were both about 0.005 inch. After the indicated cutting time, the tools were removed and examined for wear, etc. The results are set forth in the following table.

TABLE 1

| Item | Tool Description | Total Cutting Time (min.) | Total Wear (inches) | Type of Wear |
|---|---|---|---|---|
| 1 | Sintered tungsten carbide 97WC3Co | 3 | 0.065 | abrasive |
| 2 | 0–30 ceramic tool (Al₂0₃ base) | 3 | 0.125 | abrasive |
| 3 | Natural diamond 1 single crystal | | 30.006 | chipping |
| 4 | Composite tool insert as shown in FIG. 6 (sintered dia./ 94WC6Co) corner 1 | | 30.000 | none detected |
| 5 | Brown natural diamond-single crystal | | 60.008 | chipping |
| 6 | Yellow natural diamond-single crystal | | 60.004 | chipping |
| 7 | Cont'd. use of item 4 - corner 1 | | 90.001 | abrasive |
| 8 | Corner 2 of item 4 | | 300.0005 | abrasive |
| 9 | Corner 2 of item 4 | | 600.0015 | abrasive |
| 10 | Corner 2 of item 4 | | 900.0025 | abrasive |
| 11 | Corner 2 of item 4 | | 1200.0035 | abrasive |

After a few minutes of use, each of the single diamond tools failed to perform satisfactorily, because of the edge chipping. Such tools are known to be sensitive to chipping. The sintered diamond/carbide composite tool insert of this invention does not appear to be sensitive to chipping in the machining of refractory non-metals and hence has a longer useful life. Tool No. 1 was made of the hardest grade of cemented carbide commercially available but, like the aluminum oxide tool, is not hard enough to prevent rapid wear in the cutting of refractory non-metals.

Aluminum oxide coatings of the kind used in this test are employed as sealing surfaces on rotating parts in aircraft gas turbines, for example. The mechanical properties of the coating tested are comparable to those of many ceramics (e.g. borides, nitrides, carbides, etc.) — bodies used for a wide variety of purposes, often as parts having precise shapes and dimensions. A long-lasting diamond tool that can machine such materials has considerable utility.

EXAMPLE 5

Item No. 4 (Table 1) was made as follows: a base block of 94WC6Co of sintered carbide received a layer (0.130 gram) of 100/120 mesh manufactured diamond thereover. The combination was enclosed in a zirconium sheath. A second block of 94WC6Co was located over the diamond layer (outside the Zr sheath) and the system was subjected to 55 kb and 1,500° C for 1 hour.

EXAMPLE 6

A tool insert was prepared by enclosing a mixture of 100/200 mesh manufactured diamond and 94WC6Co powder (70 volume % diamond and 30 volume % carbide powder) in a cylindrical Zr cup and subjecting the combination to 55 kb and 1,500° C for 30 minutes. The cylindrical tool insert formed was 0.240 inch in diameter and about 0.1 inch thick.

This tool insert was tested by machining the $Al_2O_3$ coating on the shaft used in Table 1. The cutting speed used was 50 feet/minute at a feed of 0.005 inch for a period of 3 minutes. The wear was measured to be 0.0055 inch and slight chipping was observed. This tool insert did not perform as well as the insert of Example 5, but was markedly superior to both Item No. 1 and Item No. 2 of Table 1.

Continued research may well result in the identification of other metals and/or alloys able to function as bonding agents in the sintering of carbide molding powders. Any such metals or alloys that are also included among the catalyst-solvents disclosed in the aforementioned U.S. Pat. No. 2,947,609 and U.S. Pat. No. 2,947,610 should, when used in effective amounts, be able to exercise the dual functions required for the practice of this invention; namely, sintering of the carbide powder and converting of the graphite to diamond at temperatures and pressures in the diamond stable region.

What we claim as new and desire to secure by Letters Patent of the United States is:

1. In a tool for machining with diamond wherein the diamond crystalline material for machining is held by a support material and said diamond crystalline material and said support material comprise a tool insert, which tool insert is in turn to be held by a tool shank adapted to be held in a machine tool, the improvement in tool insert construction in which:

a. the diamond crystalline material comprises a concentration of diamond in excess of 70 percent by volume in which diamond crystals are directly bonded to adjacent diamond crystals,
   b. the support material is a mass of cemented carbide considerably larger in volume than the volume of the concentration of said diamond crystalline material and
   c. said diamond crystalline material and said cemented carbide being joined at an interface, said interface consisting solely of cemented carbide and diamond crystals, the bond therebetween being stronger than the tensile strength of the diamond.

2. The improvement in claim 1 wherein the tool insert is indexable.

3. The improvement in claim 1 wherein the diamond crystalline material is present as a sheet having a thickness of about 30 mils or less.

4. The improvement in claim 1 wherein at least one exposed face of the diamond crystalline material contains crystals from the group consisting of titanium carbide and zirconium carbide.

5. The improvement in claim 1 wherein the concentration of diamond in the diamond crystalline material is in excess of 90 percent by volume.

6. The improvement in claim 1 wherein the diamond crystalline material is composed of diamond and cemented carbide uniformly distributed therein.

7. The process for preparing a diamond-tipped tool insert comprising the steps of:

a. placing within an enclosure of protective metal a mass of carbide molding powder and contiguous thereto a smaller mass containing diamond particles in greater than 70 percent by volume concentration, the carbide being selected from the group consisting of tungsten carbide, titanium carbide, tantalum carbide and mixtures thereof and the bonding metal being selected from the group consisting of cobalt, nickel and iron,
   b. simultaneously heating said enclosure and the contents thereof to temperatures in the range of 1,400° – 1,600° C and applying pressures in excess of about 45 kilobars for at least 3 minutes,
   c. ceasing the input of heat to said enclosure,
   d. removing the pressure applied to said enclosure, and
   e. removing protective metal from the unified mass produced.

8. The process recited in claim 7 wherein the carbide molding powder is a mixture of tungsten carbide powder and cobalt powder.

9. The process recited in claim 7 wherein the diamond particles are disposed in a layer over at least one flat surface of the mass of carbide molding powder, said layer being about 30mils or less in thickness.

10. The process for preparing a diamond-tipped tool insert comprising the steps of:

a. placing within an enclosure of protective metal a body of cemented carbide and contiguous thereto a mass smaller in volume containing diamond particles in greater than 70 percent by volume concentration, the carbide being selected from the group consisting of tungsten carbide, titanium carbide, tantalum carbide and mixtures thereof bonded together with metal selected from the group consisting of cobalt, nickel and iron, b. simultaneoulsy heating said enclosure and the contents thereof to temperatures in the range of 1,400° - 1,600° C and applying pressures in excess of about 45 kilobars for at least 3 minutes, c. ceasing the input of heat to said enclosure, d. removing the pressure applied to said enclosure, and e. removing protective metal from the unified mass produced.

11. The process of claim 10 wherein the cemented carbide body is tungsten carbide cemented with cobalt.

12. The process of claim 10 wherein the diamond particles are disposed in a layer over at least one flat surface of the cemented carbide body, said layer being about 30 mils or less in thickness.

13. A tool insert consisting of a sintered carbide mass supporting at least one mass, smaller in volume, of harder abrasive material, said harder abrasive material comprising a concentration of diamond in excess of 70 percent by volume and a material selected from the class consisting of metals able to function both as sintering agents for carbide powders and as catalyst-solvents for the conversion of graphite to diamond at temperatures and pressures in the diamond-stable region and carbides thereof, said diamond being in the form of crystals directly bonded to adjacent diamond crystals, said at least one mass of harder abrasive material and said sintered carbide mass being joined along interface area consisting solely of cemented carbide and diamond, the bond therebetween being stronger than the tensile strength of diamond.

14. The tool insert of claim 13 wherein the at least one mass of harder material is present as a sheet having a thickness of about 0.030 inch or less.

15. The tool insert of claim 13 wherein the class recited consists of cobalt metal, nickel metal and iron carbide.

16. The tool insert of claim 15 wherein the material selected is cobalt.

17. The tool insert of claim 13 wherein the at least one mass of harder material also contains cemented carbide uniformly distributed therein.

18. The tool insert of claim 13 wherein the product is an indexable tool insert.

* * * * *

UNITED STATES PATENT OFFICE
CERTIFICATE OF CORRECTION

Patent No. 3,745,623   Dated July 17, 1973

Inventor(s) Robert H. Wentorf, Jr. and William A. Rocco

It is certified that error appears in the above-identified patent and that said Letters Patent are hereby corrected as shown below:

In Table I, column 10 of the patent the third and fourth columns as set forth below on the <u>left</u> should read as set forth below on the <u>right</u>:

| Total Cutting Time (min.) | Total Wear (inches) | Total Cutting Time (min.) | Wear (inches) |
|---|---|---|---|
| 3 | 0.065 | 3 | .065 |
| 3 | 0.125 | 3 | .125 |
|   | 30.006 | 3 | .006 |
|   | 30.000 | 3 | .000 |
|   | 60.008 | 6 | .008 |
|   | 60.004 | 6 | .004 |
|   | 90.001 | 9 | .001 |
|   | 300.0005 | 30 | .0005 |
|   | 600.0015 | 60 | .0015 |
|   | 900.0025 | 90 | .0025 |
|   | 1200.0035 | 120 | .0035 |

Signed and sealed this 1st day of October 1974.

(SEAL)
Attest:

McCOY M. GIBSON JR.
Attesting Officer

C. MARSHALL DANN
Commissioner of Patents